Patented Feb. 20, 1951

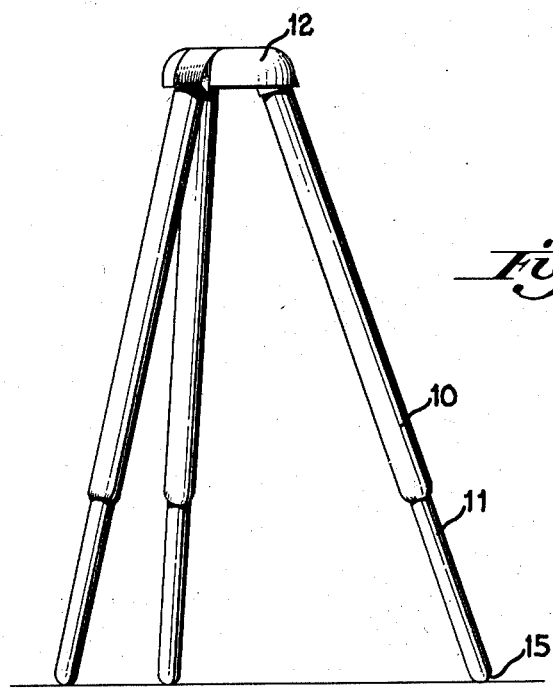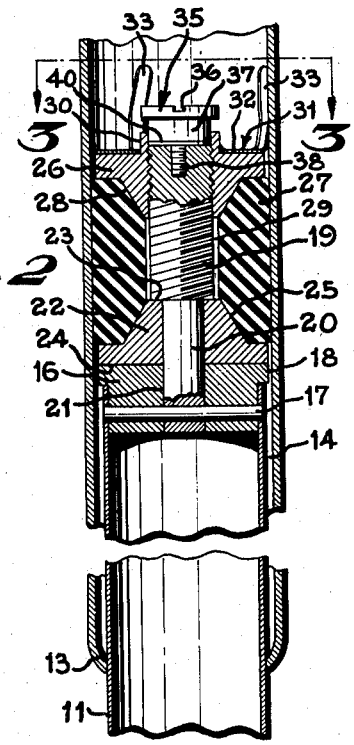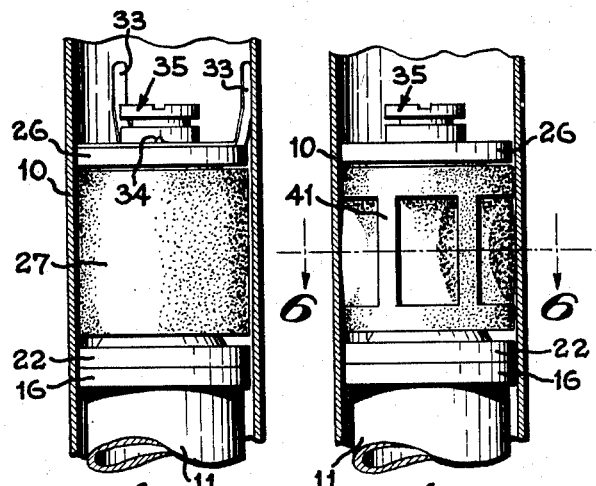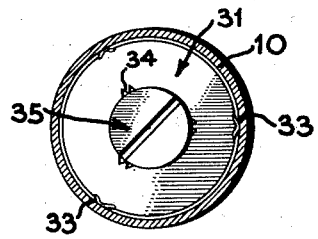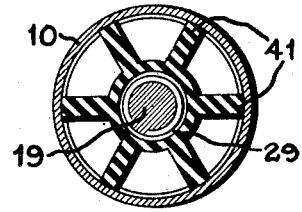

2,542,967

UNITED STATES PATENT OFFICE 2,542,967

TELESCOPIC TUBE LOCKING MEANS

Harry J. Waechter, Mount Healthy, Ohio, assignor to Paul Benninghofen and Eleanor C. Diesbach, Hamilton, Ohio, as trustees Application July 12, 1947, Serial No. 760,621

4 Claims. (Cl. 248—191)

This invention relates to telescoping tubes and is particularly directed to a device for locking the tubes in selected extended positions. An example of the uses to which the arrangement can be put is that of tripod legs where it is desired to vary the height of the tripod by varying the length of the legs. In this use and any other use to which these telescopic tubes are adapted to be applied, it is highly desirable that the locking of the sections in adjusted position be accomplished quickly and in the most simplified manner.

Accordingly, it has been the object of the present inventor to provide, in combination with a pair of telescoping tubes, a clamping or locking device which is immediately effective for locking the tubular sections together when one section is rotated slightly relative to the other.

It has been a further object of the present inventor to provide a device of this character which is not only easily and quickly set in clamped or locked position but is readily released. Further, the improved structure in its preferred form incorporates an arrangement of elements which will cooperate with the smooth internal bore of the outer tube to bring about an immediate clamping action.

Other objects relate to the structure and arrangement of the elements whereby the device is easily assembled and is of extremely durable construction capable of withstanding hard usage. In its detailed aspects the device may take several forms. The principle in general is to provide oppositely related conical elements which are drawn together upon a pliable, flexible bushing sleeve and which are effective for pressing the sleeve outwardly as it is compressed from the ends so as to make frictional contact with the internal bore of the outer tube. One of the problems solved in this structure is to provide an efficient means for preventing common rotation of the tube section and the movable clamping member, that is to bring about immediate relative motion so that prompt and effective clamping action follows. Toward this end the inventor has provided drag means either associated with the actuable element or with the clamping sleeve itself which will cause these elements to remain stationary relative to the rotating tube so as to produce the necessary clamping action.

Other objects and certain advantages will be more fully set forth in the description with reference to the accompanying drawings in which:

Figure 1 is a side view of a tripod showing extensible or sectional legs of the type in which the present improvement may be incorporated.

Figure 2 is a fragmentary sectional view taken diametrically and longitudinally of one of the leg structures for illustrating the device for holding the legs in any fixed adjusted position.

Figure 3 is a sectional view taken on line 3—3, Figure 2, further illustrating the clamping or locking device in clamping position.

Figure 4 is a view showing the outer tube section in diametric cross section and showing an exterior side view of the clamping device, the view showing the device in released condition.

Figure 5 is a view taken similar to Figure 4 but illustrating a modified form of the device.

Figure 6 is a sectional view taken on line 6—6, Figure 5, detailing in particular the rubber clamping member of the modified device.

A device of this invention is intended for use in any environment where telescoping tubes are utilized. It is designed to hold these telescoping tubes in any adjusted position within the limits prescribed by the lengths of the respective tubular sections. A typical environment for its use is in the legs of a tripod. Such structure is shown in Figure 1, the upper and lower sections being indicated at 10 and 11 respectively. The legs support a base member 12 for the camera or whatever mechanism is supported on the tripod.

The upper section 10 is a plain tube with the exception that its lower end is turned inwardly as at 13 so as to have a snug sliding fit with the lower tube 11. The upper tube is slightly larger than the lower tube, there being clearance 14 between these tubes. The lower end of the lower tube section is rounded to close the same and to provide for smooth contact with the floor, the rounded end being indicated at 15.

The upper end of the lower tube has a circular plug 16 fixed therein by means of a pin 17. The pin is disposed diametrically relative to the upper end of the tube and passes through that portion of the plug which is inserted in the tube. The upper end of the plug is enlarged as indicated at 18 so as to overhang the upper end of the tube but is slightly less in diameter than the internal diameter of the upper tube. A clamp actuating screw 19 extends axially upwardly from the plug 16. As shown in Figure 2, the threads of screw 19 are relatively steep pitched. This screw includes a counterturned lower stud portion 20 which is inserted in a bore 21 in the plug. This counterturned portion or stud is also traversed by the pin 17 holding it in position within the plug.

A conical thrust or bearing member 22 is loosely rotatably mounted upon the top of the plug and has its upper end engaged by the shoulder 23 constituted by the counterturned lower end of the screw. Specifically this element includes a base flange 24 which is circular and a conical portion 25 which rises from the base flange, its base diameter being less than the outside diameter of the base flange. A conical element 26, identical to the one just described, is mounted on the screw threads at the upper end of the screw 19. This element 26 is inverted and the two elements, that is 22 and 26, are spaced apart so as to receive and engage the respective ends of a clamping bushing 27.

This clamping bushing is formed of rubber and is in the form of a plain cylinder except that its internal bore includes conical portions 28 at its upper and lower ends which engage and match with the conical elements 22 and 26. The internal bore of this bushing is of a diameter larger than that of the screw threads. Accordingly, a clearance 29 exists between the clamping bushing and the screw. A collar or flange 30 extends upwardly from the upper conical element 26, merely being an extension thereof.

A friction element 31 is secured upon the upper surface of the upper conical element 26. This friction element includes a base portion 32 and a series of upwardly extended spring arms 33 lying around its outer margin and having frictional spring urged contact with the internal bore of the upper tube. These spring arms are concave-convex, their convex rounded outer surfaces providing a smooth contact with the bore of the upper section. This friction element is secured into position by means of small metal spurs 34 formed in the bore which surrounds the collar 30. The points of these spurs are disposed on a circumference slightly less than that of the bore so that when the friction element is assembled by pressing it down on top of the upper conical element, the spurs bite into the outer surface of the collar and assume an inclined position preventing withdrawal.

A limit screw or spacer element 35 is screwed axially into the upper end of the screw element. This element includes the usual slotted head 36, an intermediate body portion 37 and a screw threaded stud 38 screwed into the axial bore of the screw element. The body portion fits snugly within the bore of the collar and a lock washer 40 is inserted between the element and the top of the screw element. As shown in Figure 2, there is sufficient space between the head of this element and the top of the collar of the upper conical element to permit rotative movement and longitudinal translation of the upper conical element in its clamping movements.

Therefore, it will be apparent when the lower section is rotated so as to screw the screw threaded element into the upper conical element, the upper conical element is drawn downwardly upon the clamping bushing. This action compresses the rubber element and tends to spread it radially causing the outer surface of the rubber bushing to firmly grip the internal wall of the upper section. Since there might be some tendency for the upper conical element to rotate with the screw threads, the spring-like arms of the friction element are employed for preventing this. Their engagement with the internal wall of the upper section tends to hold the upper conical section against rotation. However, the pressure of these arms is not sufficient to prevent easy longitudinal movement. That is to say their tension is adjusted so as to cause a dragging action on the upper conical element. As soon as the upper conical element begins to bear down on the rubber bushing, there is added friction because of the rubber and metal contact and further rotation is effective for tightly clamping the sections together.

As an alternative to the above-described structure, a modified form of the device is shown in Figures 5 and 6. In this form the rubber bushing is fluted as at 41. These radially longitudinally disposed flutes are spaced apart as shown in Figure 6 so as to permit sufficient play of the flutes for creating wedging actions. These flutes are formed by milling circular slots longitudinally in the side wall of the bushing (Figure 5). They do not extend entirely to the upper and lower limits of the bushing but solid portions remain to provide the requisite body for the bushing. In the first form the rubber bushing is slightly spaced from the internal wall of the upper element.

In the instance of this modification the rubber bushing is slightly barrel-shaped so that its larger central portion will continuously engage the internal wall of the upper section. This engagement provides sufficient frictional contact to provide a drag so that the bushing will not rotate when the lower section is rotated. Since the upper conical element will always normally lie against its conical mating surface of the bushing, the rubber bushing will act as a means for holding the upper conical element stationary when the lower section is rotated. Thus, relative motion between the screw element and the conical element will occur and the bushing will be clamped and squeezed between the conical members to produce the clamping action. In operating the device of the modification, sudden rotations of the lower section result in a quicker clamping action for they tend to prevent clinging of the upper conical element to the threads of the screw. If the lower section is rotated slowly the upper conical element might tend to cling to the screw and, despite some contact with the rubber bushing, might tend to rotate with it momentarily.

Having described my invention, I claim:

1. For use with a pair of telescoping tubes, a device for locking the tubes in adjusted telescoped positions comprising; a rubber sleeve mounted on the end of the internally disposed tube and adapted to grip the internal wall of the outer tube, said rubber sleeve including a conical bore portion at one end of its internal bore, a conical actuating member fitted into said conical bore portion, a screw member loosely traversing the sleeve and being screw threaded through said conical member whereby rotation of the internal tube in one direction will compress the rubber sleeve and outwardly expand the same against the internal bore of the outer tube and rotation in the other direction will release said sleeve from said compressive pressure, means for continuously exerting a frictional drag on the conical member relative to the internal bore of the outer tube so that upon rotation of the internal tube, relative motion will occur between the screw and the conical member.

2. For use with a pair of telescoping tubes, a device for locking the tubes in adjusted telescoped positions comprising; a rubber sleeve mounted on the end of the internally disposed tube and adapted to grip the internal wall of the outer tube, said rubber sleeve including conical bore portions at the respective ends of its internal bore, conical actuating members respectively fitted into said conical bore portions, a screw member loosely traversing the bore of the sleeve and being screw threaded through one of the conical members whereby rotation of the internal tube in one direction will compress the rubber sleeve and outwardly expand the same against the internal bore of the outer tube and rotation in the other direction will release said sleeve from said compressive pressure and, means for continuously exerting a frictional drag on said latter conical member relative to the internal bore of the outer tube so that upon rotation of the internal tube relative motion will occur between the screw and the conical member.

3. A device for locking a pair of telescoped tubes in various positions of axial adjustment relative to each other comprising; a screw member axially projected from the inwardly disposed end of the internal tube, a conical member screw threaded on the threads of the screw, a rubber bushing surrounding the screw, said bushing including a flared internal bore portion at the end thereof mating with the conical portion of the conical member whereby rotation of the internal tube and the screw relative to the outer conical member causes compressing of the bushing and outward pressure of the bushing against the internal bore of the outer tube, said bushing including longitudinally externally disposed flutes whereby the engagement of the flutes with the internal wall of the outer tube will tend to prevent rotation of the bushing and engagement of the bushing with the conical member will provide a drag for preventing rotation of the conical member with the screw.

4. A device for locking a pair of telescoped tubes in various positions of axial adjustment relative to each other comprising; a screw member axially projected from the inwardly disposed end of the internal tube, a conical member loosely rotatably mounted on said screw adjacent the end of the internal tube, a second conical member screw threaded on the threads of the screw in a position spaced from the first-named conical member, the conical portions of the members facing each other, a rubber bushing surrounding the screw and disposed between the conical members, said bushing including flared internal bore portions at the respective ends thereof mating with the conical portions of the conical members whereby rotation of the internal tube and the screw relative to the screw threaded conical member causes compressing of the bushing between the conical members and outward pressure of the bushing against the internal bore of the outer tube, said bushing including longitudinally externally disposed flutes and the bushing being barrel-shaped in external contour whereby the engagement of the flutes with the internal wall of the outer tube will tend to prevent rotation of the bushing and engagement of the bushing with the screw threaded conical member will provide a drag for preventing rotation of this conical member with the screw.

HARRY J. WAECHTER.

REFERENCES CITED

The following references are of record in the file of this patent:

UNITED STATES PATENTS

| Number | Name | Date |
| --- | --- | --- |
| 663,804 | Buder | Dec. 11, 1900 |
| 2,019,753 | Wittel | Nov. 5, 1935 |
| 2,374,947 | Nicholson | May 1, 1945 |

FOREIGN PATENTS

| Number | Country | Date |
| --- | --- | --- |
| 530,320 | Germany | Mar. 18, 1930 |
| 718,486 | France | Nov. 4, 1931 |